(12) United States Patent
Kim

(10) Patent No.: US 6,469,479 B2
(45) Date of Patent: Oct. 22, 2002

(54) POWER CONTROL SYSTEM AND METHOD FOR A DISPLAY APPARATUS

(75) Inventor: Hong-Ki Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/854,515

(22) Filed: May 15, 2001

(65) Prior Publication Data

US 2002/0079872 A1 Jun. 27, 2002

(30) Foreign Application Priority Data

Dec. 27, 2000 (KR) .............................. 00-83360

(51) Int. Cl.$^7$ .............................................. G05F 1/577
(52) U.S. Cl. ........................................................ 323/267
(58) Field of Search ................................. 323/267, 269, 323/270, 271; 307/17, 31, 37, 38, 39; 363/15, 16, 95, 97, 131

(56) References Cited

U.S. PATENT DOCUMENTS

| | | | |
|---|---|---|---|
| 4,095,166 A | * | 6/1978 | Shibata et al. ................. 323/17 |
| 4,677,534 A | * | 6/1987 | Okochi ......................... 363/21 |
| 5,170,096 A | | 12/1992 | Kang et al. |
| 5,905,491 A | * | 5/1999 | Kim ............................ 345/212 |
| 5,991,168 A | * | 11/1999 | Farrington et al. ............ 363/16 |

FOREIGN PATENT DOCUMENTS

| | | |
|---|---|---|
| JP | 08-098405 | 4/1996 |
| JP | 08-237859 | 9/1996 |
| JP | 08-308236 | 11/1996 |
| JP | 08-331846 | 12/1996 |
| JP | 10-191638 | 7/1998 |
| JP | 10-304660 | 11/1998 |
| JP | 11-027943 | 1/1999 |

* cited by examiner

*Primary Examiner*—Matthew Nguyen
(74) *Attorney, Agent, or Firm*—Robert E. Bushnell, Esq.

(57) ABSTRACT

A power control system for a display apparatus comprises: a reactor, including a pair of inductors, for calibrating a power factor of an AC voltage supplied from an external source; a rectifier for rectifying the AC voltage having the power factor calibrated by the reactor; a power supply for outputting the rectified voltage with a plurality of voltage levels so as to allow them to be supplied to a power-consuming component; a switch unit for selectively connecting the pair of inductors in series or in parallel based on a driving power according to the levels of the AC voltage supplied to the reactor; and a microcomputer for determining whether a DPMS is in an off mode so as to cut off the power supply to the component, and for cutting off the power supply to the switch unit when it is in the off mode. With this configuration, since the power supply to the switch unit is cut off in the off mode, power consumption in the off mode can be minimized. A power control method for a display apparatus comprises steps corresponding to the functions described above relative to the power control system.

25 Claims, 3 Drawing Sheets

US 6,469,479 B2

POWER CONTROL SYSTEM AND METHOD FOR A DISPLAY APPARATUS

CLAIM OF PRIORITY

This application makes reference to, incorporates the same herein, and claims all benefits accruing under 35 U.S.C. §119 from my application POWER CONTROLLING SYSTEM AND METHOD FOR DISPLAY filed with the Korean Industrial Property Office on Dec. 7, 2000 and there duly assigned Serial No. 83360/2000.

BACKGROUND OF THE INVENTION

1. Technical Field

The present invention relates, in general, to a power control system and method for a display apparatus and, more particularly, to a power control system and method for a display apparatus wherein voltage applied to a switch unit for switching a reactor is cut off in an off mode, thereby reducing power consumption in the off mode.

2. Related Art

A typical power control system for a display apparatus includes a reactor provided with a pair of inductors, a switch unit connecting the inductors of the reactor with each other in either series or in parallel, a rectifier for rectifying AC voltage, a power supply for supplying the rectified voltage to various components of the apparatus, a voltage detector for detecting voltage between the rectifier and the power supply, and for supplying driving power to the switch unit, and a microcomputer for controlling a display power management system (DPMS).

The DPMS reduces power consumption when the display apparatus has not been in use for a certain period of time. The typical DPMS has several modes: an on mode, a stand-by mode, a suspension mode, and an off mode. Each mode is preprogrammed for a certain maximum power consumption. For example, the stand-by mode is set for about 80 W, the suspension mode is set for about 15 W, and the off mode is set for about 3 W.

When the DPMS enters the off mode, the microcomputer cuts off the output of vertical and horizontal synchronizing signals, and also cuts off power supply to each component of the display apparatus, as well as to the vertical and horizontal deflection circuits. However, when 220V is applied to the power control system, driving power is steadily supplied to the switch unit. As a result, power of 3.6 W is consumed, and that exceeds the maximum power consumption (3 W) preprogrammed for the off mode. This causes the excessive consumption of power, and defeats the purpose of the DPMS.

Therefore, there is a need for a power control system and method for a display apparatus in which driving power is not steadily supplied to the switch unit when 220V is applied to the power control system.

The following documents are considered to be generally pertinent to the invention disclosed and claimed herein, but are burdened by the disadvantages set forth above: Japanese Patent No. 08-98405 to Maekawa, entitled ACTIVE FILTER DEVICE, published on Apr. 12, 1996, Japanese Patent No. 08-308236 to Yasumura, entitled SWITCHING POWER SOURCE CIRCUIT, published on Nov. 22, 1996, Japanese Patent No. 08-237859 to Miyagi, entitled POWER SOURCE CIRCUIT FOR A ELECTRONIC DEVICE, published on Sep. 13, 1996, Japanese Patent No. 08-331846 to Yatori, entitled POWER SOURCE DEVICE, published on Dec. 13, 1996, Japanese Patent No. 11-27943 to Sato et al., entitled POWER SOURCE DEVICE, published on Jan. 29, 1999, Japanese Patent No. 10-191638 to Uchibori, entitled SWITCHING POWER SUPPLY DEVICE, published on Jul. 21, 1998, Japanese Patent No. 10-304660 to Aoki, entitled POWER SUPPLY CONTROLLER, published on Nov. 13, 1998, and U.S. Pat. No. 5,170,096 to Kang et al., entitled DEGAUSSING CIRCUIT USING A RELAY, issued on Dec. 8, 1992.

SUMMARY OF THE INVENTION

Accordingly, the present invention has been developed while keeping in mind the above-described problem, and it is an object of the present invention to provide a power control system and method for a display apparatus wherein power supplied to a switch unit for switching a reactor in an off mode is cut off, thereby reducing the power consumption in the off mode.

These and other objects of the present invention are accomplished by provision of a power control system for a display apparatus, comprising: a reactor, including a pair of inductors, for calibrating a power factor of an AC voltage externally supplied; a rectifier for rectifying the AC voltage having the power factor calibrated by the reactor; a power supply for outputting the rectified voltage with a plurality of voltage levels so as to allow them to be supplied to a power-consuming component; a switch unit for connecting the pair of inductors in the reactor in series or in parallel based on a driving power according to the levels of the AC voltage supplied to the reactor; and a microcomputer for determining whether a DPMS is in an off mode so as to cut off power supply to the component, and to cut off the power supply to the switch unit if it is in the off mode.

The power control system further comprises a voltage detection output circuit connected to one of the output terminals of a power supply for detecting the voltage level outputted by the power supply.

Preferably, the power control system further comprises an off mode switch connected to the other output terminal of the power supply for cutting off the power outputted by the power supply in the off mode.

The switch unit comprises a pair of three-contact relay switches and a driving coil for driving the relay switches. One end of the driving coil is connected to the off mode switch and the other end thereof is connected to the voltage detection output circuit, thereby being supplied with power from the power supply.

Preferably, the power control system further comprises a voltage detection switch connected between the voltage detection output circuit and the driving coil for detecting the level of the AC voltage, and for allowing power to be supplied to the driving coil when the level of the AC voltage is greater than a predetermined level.

The microcomputer turns off the off mode switch in the off mode so as to cut off the power supply to the driving coil.

According to another aspect of the present invention, these and other objects may also be achieved by provision of a power control method for a display apparatus which comprises a reactor, including a pair of inductors, for calibrating a power factor of an AC voltage supplied from the outside, a rectifier for rectifying the AC voltage having the power factor calibrated by the reactor, a power supply for outputting the rectified voltage with a plurality of voltage levels so as to allow them to be supplied to a power-consuming component, and a switch unit for connecting the pair of inductors in series or in parallel based on a driving power corresponding to the level of the AC voltage supplied to the reactor. The method comprises the steps of determining whether a DPMS is in an off mode so as to cut off the power supply to each component, and cutting off the power supply to the switch unit in the off mode.

Preferably, the power control method further comprises the steps of detecting the level of the AC voltage supplied to the reactor, and supplying power to the switch unit if the detected level of the AC voltage is greater than a predetermined level.

It is also preferable that the power control method further comprise the steps of connecting the switch unit to an output terminal of the power supply so as to allow it to be supplied with power from the power supply, and mounting an off mode switch at the output terminal of the power supply so as to cut off the power supplied by the power supply. In the step of cutting off the power supply to the switch unit in the off mode, the off mode switch is turned off.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE PREFERRED EMBODIMENTS

Hereinbelow, the present invention will be described in detail with reference to the accompanying drawings.

Figure 3:
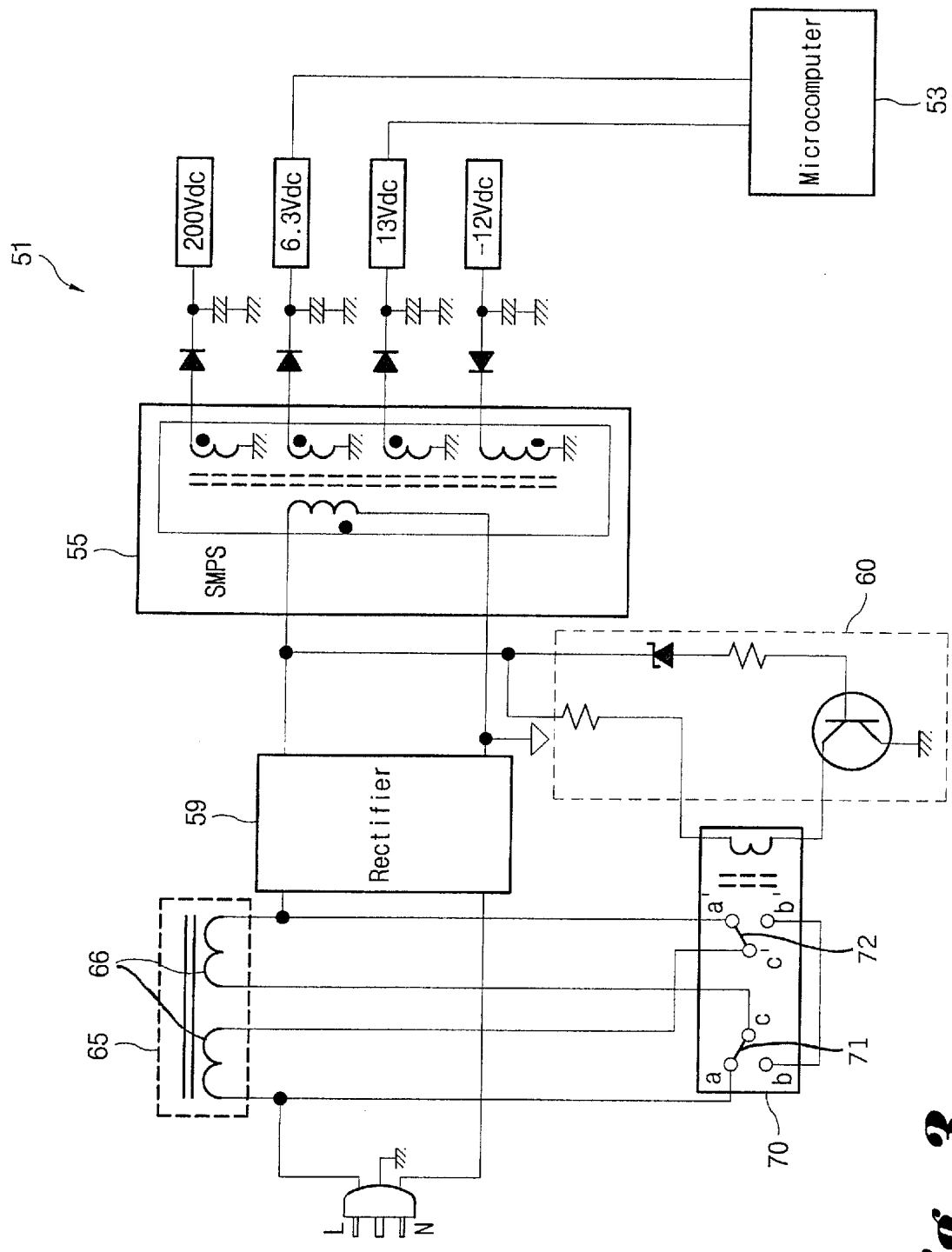
FIG. 3 is a circuit diagram showing a power control system for a display apparatus.

FIG. 3 is a circuit diagram showing a power control system for a display apparatus. Referring to FIG. 3, a power control system 51 for supplying power to a display apparatus comprises: a reactor 65 provided with a pair of inductors 66 for calibrating a power factor of an alternating current (AC) voltage externally supplied; a switch unit 70 connecting the inductors 66 of the reactor 65 with each other either in series or in parallel; a rectifier 59 for rectifying AC voltage having a power factor calibrated by the reactor 65; a power supply (SMPS) 55 for supplying the rectified voltage to various components; a voltage detector 60 for detecting voltage between the rectifier 59 and the power supply 55, and for supplying driving power to the switch unit 70; and a microcomputer 53 for controlling a DPMS.

The inductors 66 are formed by being wound on a single wire, and have the same inductance.

The switch unit 70 includes a pair of relay switches 71 and 72 connecting the conductors 66 in series or in parallel, and each of the relay switches 71 and 72 is, preferably, a three-contact switch. In the relay switches 71 and 72 of the switch unit 70, contacts a and c and contacts a' and c' are, respectively, connected to each other so as to allow the inductors 66 to be connected in parallel in a normal mode. In this way, the inductance of inductors 66 and a resistance become small and, therefore, a harmonic wave of 110V AC power can be effectively eliminated.

On the other hand, if a voltage of 220V is applied, driving power is supplied to the switch unit 70 by the power detector 60. At this point, contacts b and c and contacts b' and c' are, respectively, interconnected with each other, allowing the inductors 66 to be interconnected in series. Accordingly, the inductance and the resistance become larger, thereby effectively eliminating a harmonic wave of 220V power. As described above, if a voltage of 220V is applied, driving power is continuously supplied to the switch unit 70, and a current of 300 mA steadily flows into the switch unit 70. Therefore, when the 220V is applied, a power of 3.6 W is steadily consumed, which is obtained by multiplying the driving power of 12V by the current of 300 mA.

A display apparatus usually employs a DPMS in order to reduce power consumption when it has not been in use for a long time. The DPMS has an on mode, a standby mode, a suspension mode and an off mode. The microcomputer 53 proceeds to each mode in sequence, depending upon how long it has been since a user has inputted a signal.

In the on mode, the microcomputer 53 allows both horizontal and vertical synchronizing signals supplied from the computer system to be outputted on a screen of the display apparatus. The microcomputer 53 allows only the vertical synchronizing signal to be outputted in the standby mode, and only the horizontal synchronizing signal to be outputted in the suspension mode. In the off mode, the microcomputer 53 prevents both the horizontal and vertical synchronizing signals from being outputted. Each mode is preprogrammed for a maximum power consumption. That is, the standby mode is set for about 80 W, the suspension mode is set for about 15 W, and the off mode is set for about 3 W.

When the DPMS enters the off mode, the microcomputer 53 cuts off the output of the vertical and horizontal synchronizing signals, and also cuts off power supply to each integrated chip (IC), and to vertical and horizontal deflection circuits. However, when 220V is applied to the power control system, since driving power is steadily supplied to the switch unit 70 as described above, power of 3.6 W is consumed, and this exceeds the maximum power consumption of 3 W in the off mode, causing an excessive consumption of power.

Figure 1:
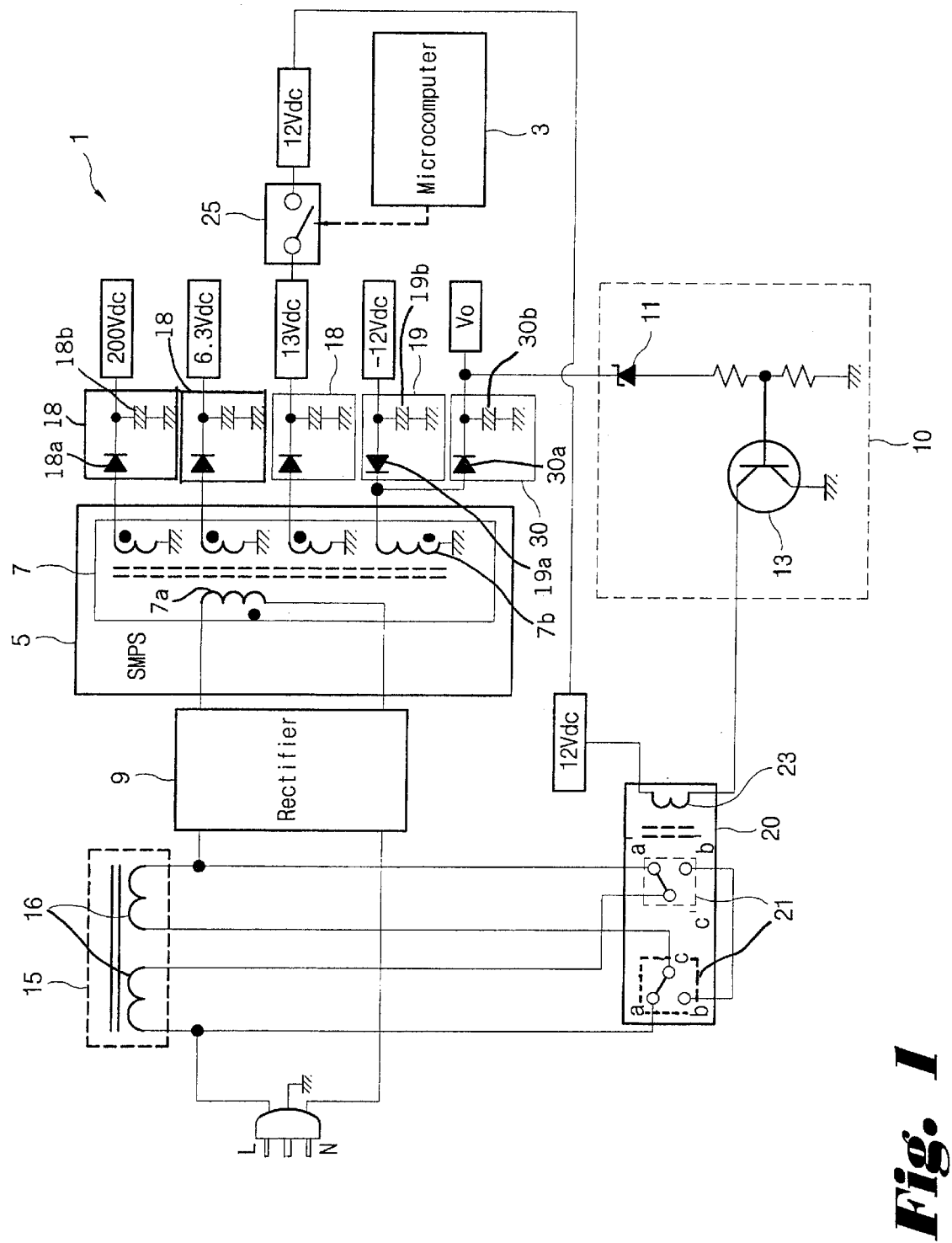
FIG. 1 is a circuit diagram showing a power control system for a display apparatus according to the present invention.

FIG. 1 is a circuit diagram showing a power control system for a display apparatus according to the present invention. Referring to FIG. 1, a power control system 1 for a display apparatus according to the present invention comprises: a reactor 15, including a pair of inductors 16, for calibrating a power factor of an AC voltage externally supplied; a rectifier 9 for rectifying the AC voltage having the power factor calibrated by the reactor 15; a power supply (SMPS) 5 for supplying the rectified voltage to each component; a switch unit 20 for connecting the inductors 16 of the reactor 15 in series or in parallel, and for receiving driving power from a secondary coil 7b of the SMPS 5; a voltage detection switch 10 connected to the secondary coil 7b of the SMPS 5 for supplying driving power to the switch unit 20; and a microcomputer 3 for controlling a DPMS.

The SMPS 5 includes a switching power transformer 7 for supplying power to horizontal and vertical deflection circuits, a heater and respective ICs (not shown). A primary coil 7a of the switching power transformer 7 is connected to the rectifier 9. The secondary coil 7b of the switching power transformer 7 is provided with a plurality of output circuits 18 and an output circuit 19 for converting the AC power outputted by the switching power transformer 7 into DC power, and for supplying the converted DC power to the horizontal and vertical deflection circuits, the heater and the respective ICs (not shown). Each of the output circuits 18 and 19 has a diode 18a and 19a, respectively, for rectification and a condenser 18b and 19b, respectively, for smoothing. A forward diode 18a is mounted in each of the output circuits 18. However, since a voltage of −12V is supplied to the vertical deflection circuit (not shown) by output circuit 19, a reverse diode 19a is mounted in the output circuit 19, which is connected to the vertical deflection circuit (not shown).

A voltage detection output circuit 30 is connected to an input terminal of the output circuit 19 which is connected to the vertical deflection circuit (not shown), and a forward diode 30a and a condenser 30b are mounted in the voltage detection output circuit 30. If the AC voltage of the primary coil 7a of the switching power transformer 7 increases, the output voltage outputted by the voltage detection output circuit 30 increases in proportion to the AC voltage. If the AC voltage of the primary coil 7a of the switching power transformer 7 decreases, the output voltage outputted by the voltage detection output circuit 30 decreases in proportion to the AC voltage. Therefore, when the output voltage of the voltage detection output circuit 30 is detected, a voltage of the power externally supplied can be measured.

An off mode switch 25 is connected to the output terminal of the output circuit 18 (which is connected to each IC) for turning on and off the power outputted by the switching power transformer 7.

The off mode switch 25 is switched on and off according to a command signal from the microcomputer 3 so as to turn on and off the power supplied to each IC, and also the power supplied to the horizontal and vertical deflection circuits (not shown). The microcomputer 3 switches the off mode switch 25 on and off according to the progress of the DPMS. In the on mode, standby mode and suspension mode, the microcomputer 3 switches the off mode switch 25 on to allow power to be supplied to each component. In the off mode, the off mode switch 25 is switched off to cut off the power supplied to each component.

The switch unit 20 comprises a pair of relay switches 21 connecting the inductors 16 in series or in parallel, and also comprises a driving coil 23. One end of the driving coil 23 is connected to a contact at each IC side of the off mode switch 25, whereas the other end of the driving coil 23 is connected, via a voltage detection switch 10, to an output side of the voltage detection output circuit 30. The voltage detection switch 10 detects a voltage of the AC power externally supplied, and turns on and off the driving power supplied to the driving coil 23.

The voltage detection switch 10 includes a zener diode 11 which is turned on when a voltage greater than a predetermined value (for example, adjacent to 220V) is detected, and a transistor 13 which is turned on in cooperation with the zener diode 11, thereby allowing driving power to be supplied to the driving coil 23.

The operation of the voltage detection switch 10 according to the inputted voltage levels will be described in more detail.

If a voltage of 110V is applied from an external source (not shown), the zener diode 11 of the voltage detection switch 10 is turned off. In response, power supply to the switch unit 20 is cut off. Then, contacts a and c and contacts a' and c' of the relay switches 21 are, respectively, connected to each other, thereby connecting the inductors 16 in parallel. As the inductance and the resistance of the inductors 16 become small, a harmonic wave of the 110V power supply can be effectively eliminated. On the other hand, if a voltage of 220V is applied from the external source, the zener diode 11 of the voltage detection switch 10 is turned on. In response, power is supplied to the switching unit 20. Then, contacts b and c and contacts b' and c' of the relay switches 21 are interconnected, thereby connecting the inductors 16 in series. As the inductance and the resistance of inductors 16 increase, a harmonic wave of the 220V power supply can be effectively eliminated.

The microcomputer 3 determines whether or not the display apparatus is used by a user. Depending upon that determination, the microcomputer 3 executes the modes in sequence. When the off mode starts, the microcomputer 3 turns off the off mode switch 25. Accordingly, in the off mode, power supplied to each IC, and to the horizontal and vertical deflection circuits, is cut off. In addition, driving power supplied to the switch unit 20 is cut off.

Figure 2:
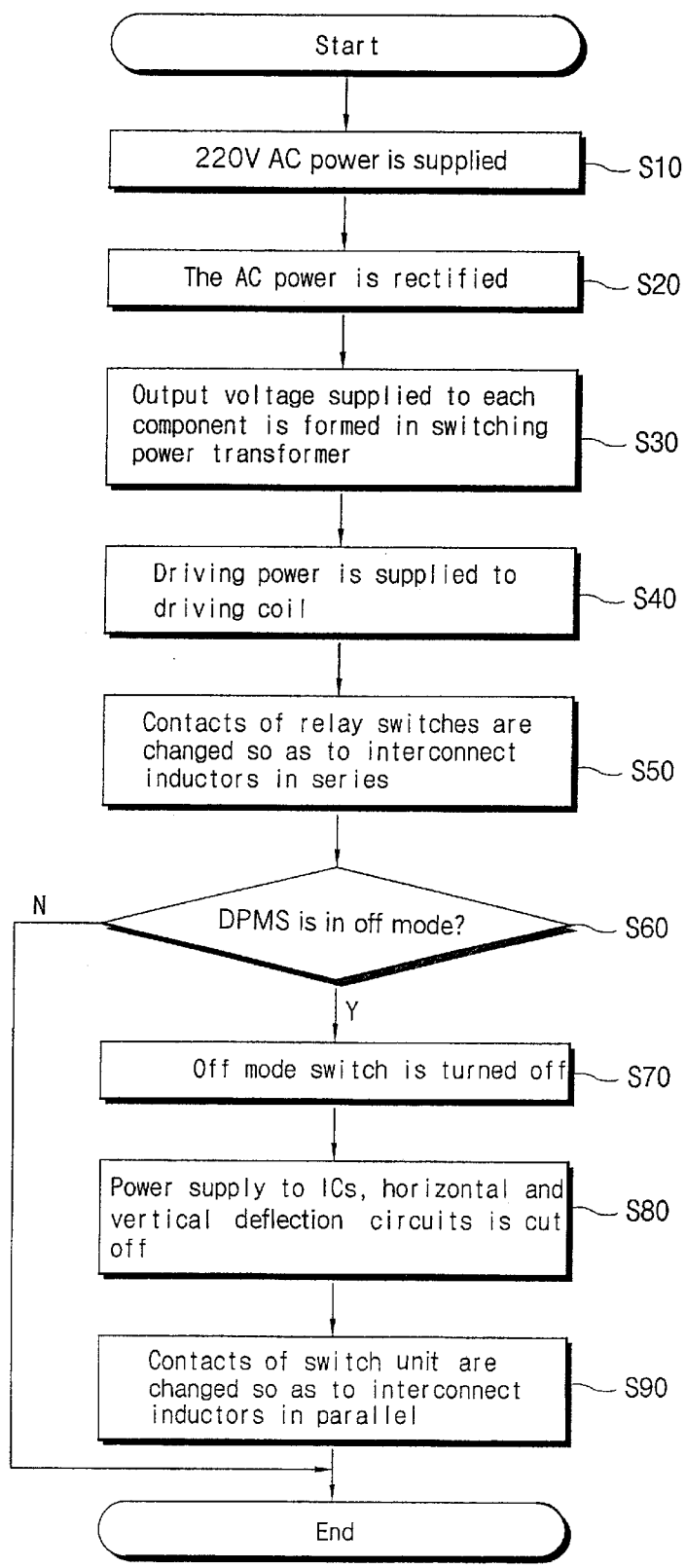
FIG. 2 is a flow chart showing a power control process carried out by the power control system of FIG. 1.

The power control method using the power control system 1 will now be described in detail with reference to FIG. 2.

When AC power of 220V is supplied to the power control system 1 (S10), the 220V AC power passes through the rectifier 9 so as to be rectified (S20), and is then inputted to the SMPS 5. The switching power transformer 7 of the SMPS 5 receives the 220V AC power, and generates a plurality of powers having different voltage levels so as to supply them to horizontal and vertical deflection circuits and the ICs (S30). Each of the output circuits 18 and 19 converts the AC voltages outputted by switching power transformer 7 into a DC voltage. At this point, an output voltage is generated in proportion to 220V, and the zener diode 11 of the voltage detection switch 10 is turned on by the output voltage from the voltage detection output circuit 30. Accordingly, power is supplied to a base of the transistor 13 so as to turn on the transistor 13, and driving power is supplied to the driving coil 23 of the switch unit 20 so as to switch the relay switches 21 (S40).

Then, the contacts b and c and contacts b' and c' of the relay switches 21 are interconnected, thereby connecting the inductors 16 in series (S50). As the inductance and the resistance of the inductors 16 increase, the harmonic wave of the 220V power supply can be effectively eliminated.

When the power control system 1 proceeds to the off mode under the condition that the 220V AC power is supplied thereto (S60), the microcomputer 3 turns the off mode switch 25 on so as to cut off the DC power supplied to each IC, and to the horizontal and vertical deflection circuits 20 (S70 and S80). Since driving power is not supplied to the switch unit 20, the inductors 16 are interconnected in parallel so as to allow the contacts a and c and contacts a' and c', respectively, of the relay switch 21 to be interconnected (S90).

Accordingly, although 220V AC power is supplied in the off mode, the driving power supplied to the switch unit 20 is cut off. Thus, power of 3.6 W due to the driving power of the switch unit 20 is not consumed. Instead, the power consumption of the display apparatus does not exceed 3 W in the off mode.

When 110V AC power is inputted into the power control system 1, an output voltage proportional to 110V is generated and provided to the voltage detection output circuit 30 (as in the case of 220V AC power). Since the zener diode 11 of the voltage detection switch 10 is not turned on with the output voltage generated in proportion to 110V, driving power is not applied to the switch unit 20.

When the power control system 1 proceeds to the off mode under the condition that the 110V AC power is applied thereto, the microcomputer 3 turns the off mode switch 25 on so as to cut off the DC power supplied to each IC, and to the horizontal and vertical deflection circuits 20. Since driving power is not supplied to the switch unit 20, the power consumption of the display apparatus does not exceed 3 W in the off mode.

As described above, according to the present invention, the voltage detection switch 10 is connected to the secondary coil 7b of the transformer 7 in SMPS 5 so as to detect a voltage level externally supplied, and the switch unit 20 is installed between the voltage detection switch 10 and the off mode switch 25, thereby allowing the switch unit 20 to be supplied with power from the secondary coil 7b of the transformer 7 in SMPS 5. In this manner, the power supplied to the switch unit 20, to the respective ICs, and to the deflection circuits can be cut off by switching on and off mode switch 25 in the off mode. Accordingly, although 220V AC power is supplied to the display apparatus, since the power supplied to the switch unit 20 can be cut off in the off mode, the power consumption of the display apparatus does not exceed 3 W. Thus, according to the present invention, since the power supplied to the switch unit 20 can be cut off in the off mode, power consumption in the off mode can be minimized.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A power control system for a display apparatus, comprising:
    a reactor including a pair of inductors for calibrating a power factor of an alternating current (AC) voltage supplied from an external source;
    a rectifier for rectifying the AC voltage having the power factor calibrated by the reactor;
    a power supply for outputting the rectified voltage with a plurality of voltage levels for supply to a power-consuming component;
    a switch unit for selectively connecting the pair of inductors in series and in parallel based on a driving power according to the voltage levels of the AC voltage supplied from the external source;
    a microcomputer for determining whether a display power management system (DPMS) is in an off mode so as to cut off the power supply to the power-consuming component, and for cutting off a power supply to the switch unit when DPMS is in the off mode; and
    a voltage detection output circuit connected between an output terminal of the power supply and an input of said switch unit for detecting the voltage level outputted by the power supply.

2. The power control system according to claim 1, further comprising an off mode switch connected to another output terminal of the power supply for cutting off power outputted by the power supply in the off mode.

3. The power control system according to claim 2, wherein the switch unit comprises a pair of three-contact relay switches and a driving coil for driving the relay switches; and
    wherein a first end of the driving coil is connected to the off mode switch and a second end of the driving coil is connected to the voltage detection output circuit, thereby being supplied with power from the power supply.

4. The power control system according to claim 3, further comprising a voltage detection switch connected between the voltage detection output circuit and the driving coil for detecting the level of the AC voltage, and for allowing power supply to the driving coil when the level of the AC voltage is greater than a predetermined level.

5. The power control system according to claim 4, wherein the microcomputer turns the off mode switch off in the off mode so as to cut off the power supply to the driving coil.

6. A power control method for a display apparatus which includes a reactor, including a pair of inductors, for calibrating a power factor of an AC voltage supplied from an outside source, a rectifier for rectifying the AC voltage having the power factor calibrated by the reactor, a power supply for outputting the rectified voltage with a plurality of voltage levels for supply to a power-consuming component, and a switch unit for selectively connecting the pair of inductors in series and in parallel based on a driving power according to the level of the AC voltage supplied from the outside source, said method comprising the steps of:
    determining whether a display power management system (DPMS) is in an off mode so as to cut off power supply to said power-consuming component; and
    cutting off the power supply to the switch unit in the off mode.

7. The power control method according to claim 6, further comprising the steps of:
    detecting a level of the AC voltage supplied from the outside source; and
    supplying power to the switch unit when the detected level of the AC voltage is greater than a predetermined level.

8. The power control method according to claim 7, further comprising the steps of:
    connecting the switch unit to an output terminal of the power supply so that said switch unit is supplied with power from the power supply; and
    mounting an off mode switch at the output terminal of the power supply for cutting off the power supplied from the power supply;
    wherein, when power supplied to the switch unit is cut off in the off mode, the off mode switch is turned off.

9. A power control system for a display apparatus, comprising:
    reactor means including a pair of inductors for calibrating a power factor of an alternating current (AC) voltage supplied from an external source;
    rectifier means for rectifying the AC voltage having the power factor calibrated by said reactor means;
    power supply means for outputting the rectified AC voltage with a plurality of voltage levels for supply to a power-consuming component;
    switch means for selectively connecting the pair of inductors in series and in parallel based on a driving power according to the voltage levels of the AC voltage supplied from the external source; and
    control means for determining whether a display power management system (DPMS) is in an off mode, and for cutting off a power supply to said switch means when the DPMS is in the off mode;
    wherein said control means comprises an off mode switch connected to an output terminal of said power supply means for cutting off power outputted by said power supply means in the off mode.

10. The power control system according to claim 9, wherein said switch means comprises relay switches and a driving coil for driving the relay switches; and
wherein an end of the driving coil is connected to the off mode switch.

11. The power control system according to claim 9, wherein said control means comprises a voltage detection output circuit connected to another output terminal of said power supply means for detecting the voltage level outputted by said power supply means.

12. The power control system according to claim 11, wherein said switch means comprises relay switches and a driving coil for driving the relay switches; and
wherein a first end of the driving coil is connected to the off mode switch and a second end of the driving coil is connected to said voltage detection output circuit, thereby being supplied with power from said power supply means.

13. The power control system according to claim 12, further comprising a voltage detection switch connected between said voltage detection output circuit and said driving coil for detecting the level of the AC voltage, and for allowing power supply to said driving coil when the level of the AC voltage is greater than a predetermined level.

14. The power control system according to claim 9, wherein said control means turns the off mode switch off in the off mode so as to cut off the power supply to the driving coil.

15. The power control system according to claim 11, wherein said switch means comprises relay switches and a driving coil for driving the relay switches; and
wherein an end of the driving coil is connected to said voltage detection output circuit.

16. The power control system according to claim 15, further comprising a voltage detection switch connected between said voltage detection output circuit and said driving coil for detecting the level of the AC voltage, and for allowing power supply to said driving coil when the level of the AC voltage is greater than a predetermined level.

17. A power control method for a display apparatus, comprising the steps of:
(a) supplying power to a switching power transformer so as to form an output voltage in said switching power transformer;
(b) determining whether a display power management system (DPMS) is in an off mode; and
(c) when the DPMS is in the off mode, turning off an off mode switch, cutting off power supply to circuits of the display apparatus, and changing contacts of a switch unit so that a plurality of inductors connected to said switch unit are interconnected in parallel.

18. The power control method according to claim 17, wherein step (a) comprises the steps of supplying alternating current (AC) power, rectifying the AC power, and supplying an output voltage corresponding to the rectified AC power by forming the output voltage in the switching power transformer.

19. The power control method according to claim 18, further comprising the step, between steps (a) and (b), of supplying driving power to a driving coil of the display apparatus.

20. The power control method according to claim 19, further comprising the step, between the step of supplying the driving power to the driving coil and step (b), of changing the contacts of the relay switches so as to interconnect the inductors in series.

21. The power control method according to claim 17, wherein, when step (b) determines that the DPMS is not in the off mode, the power control method is terminated.

22. A power control system for a display apparatus, comprising:
reactor means including a pair of inductors for calibrating a power factor of an alternating current (AC) voltage supplied from an external source;
rectifier means for rectifying the AC voltage having the power factor calibrated by said reactor means;
power supply means for outputting the rectified AC voltage with a plurality of voltage levels for supply to a power-consuming component;
switch means for selectively connecting the pair of inductors in series and in parallel based on a driving power according to the voltage levels of the AC voltage supplied from the external source;
control means for determining whether a display power management system (DPMS) is in an off mode, and for cutting off a power supply to said switch means when the DPMS is in the off mode; and
voltage detection switch means connected between an output of said power supply means and an input of said switch means for detecting the level of the AC voltage, and for allowing power supply to said switch means when the level of the AC voltage is greater than a predetermined level.

23. The power control system according to claim 22, wherein said switch means comprises a driving coil forming an input of said switch means, and said voltage detection switch means is connected to said driving coil.

24. The power control system according to claim 22, wherein said power supply means comprises a voltage detection output circuit forming an output of said power supply means, and said voltage detection switch means is connected to said voltage detection output circuit.

25. The power control system according to claim 22, wherein said voltage detection switch means comprises a diode connected in series with a pair of series-connected resistors, and a transistor having an input connected to a junction between said series-connected resistors, and having an output connected to said switch means.

* * * * *